Oct. 1, 1968 — L. T. MacLAUGHLIN — 3,403,420
WINDOW SWAB
Filed April 18, 1967
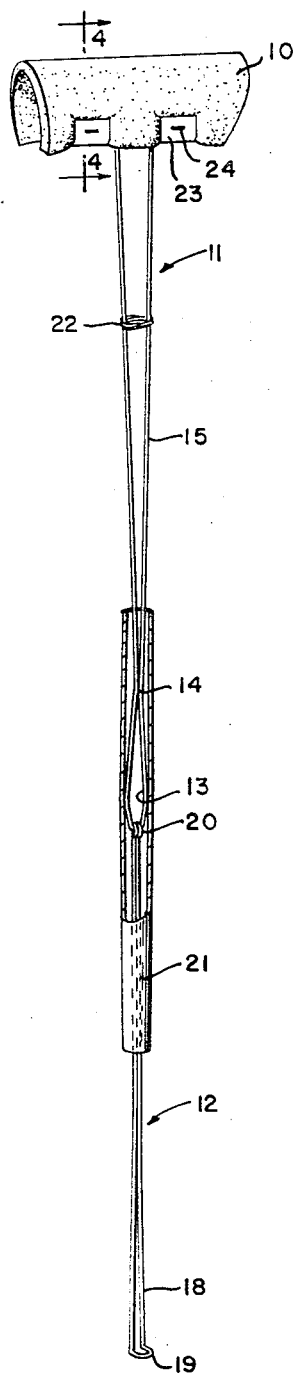
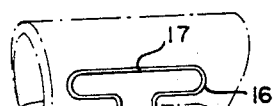
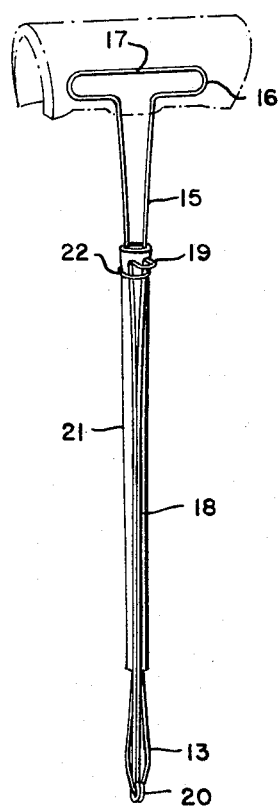
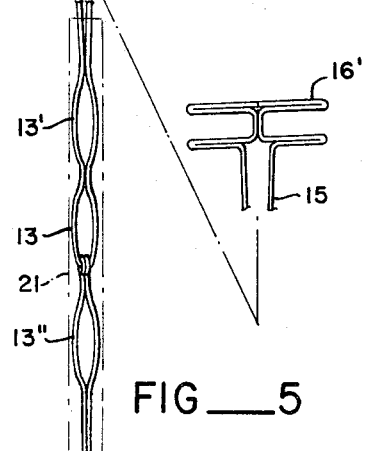
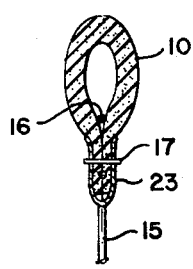
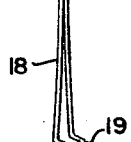
LUCIUS T. MAC LAUGHLIN
INVENTOR.
BY Seed Berry & Dowrey
ATTORNEYS

United States Patent Office 3,403,420
Patented Oct. 1, 1968

3,403,420
WINDOW SWAB
Lucius Ted MacLaughlin, 819 Dexter Ave. N.,
Seattle, Wash. 98109
Filed Apr. 18 1967, Ser. No. 631,721
6 Claims. (Cl. 15—244)

ABSTRACT OF THE DISCLOSURE

A window swab, particularly for use on automobile windows, having a handle of bent wire construction and formed with two sections hinged together to give an extended handle length if desired, the handle being held in extended position by a slidable sleeve at the hinge joint.

---

The present invention relates to a swab for use on automobile windows, particularly to free them from condensation when driver vision is impaired due to inside fogging.

Window fogging, common on cold winter mornings, is normally not solved by automobile heater defrosting systems, particularly as respects the rear and side windows, and is a hazard to safe driving. Accordingly, this invention aims to provide an inexpensive, simple and effective device for readily manually cleaning all of the fogged windows of an automobile and without need of leaving the driver's seat.

Other more particular objects and advantages of the invention will, with the foregoing, appear and be understood in the course of the following description and claims, the invention consisting in the novel construction and in the adaptation and combination of parts hereinafter described and claimed.

In the accompanying drawing:

FIG. 1 is a perspective view of a swab embodying the present invention and shown with its handle extended;

FIGS. 2 and 3 are perspective views showing alternative folded handle positions of the swab, the pad being shown in phantom;

FIG. 4 is a sectional view taken as indicated by line 4—4 of FIG. 1; and

FIG. 5 is a perspective view of a modified handle.

Referring to the drawings it is seen that the window swab of the present invention comprises a pad 10 doubled over one end of a two-part folding handle 11–12 of wire construction. Inner handle section 11 is formed by bending a length of wire at its midpoint to form an elongated center loop 13 closed at a spot-weld 14 from which branches 15 gradually diverge to a pair of oppositely extending loop wings 16 and have their free ends preferably welded together at 17.

The outer handle section 12 is also formed by bending a length of wire double at its center, but the center loop in this instance is bent at right angles to the resulting branches 18 to form an outer stop 19. Then the free ends of the branches 18 are bent over the bight of the loop 13 to form a pair of eyes 20 hingedly connecting the handle sections 11–12 together.

However, prior to thus interconnecting of the handle sections, a length of plastic tubing 21 is sleeved over one of the sections together with an elastic band 22. The inside diameter of the sleeve 21 is small enough to make a snug fit of the sleeve with the loop 13 as the sleeve moved endwise thereover to stiffen the hinge 13, 20 when it is desired to extend the handle. In fact, the loop 13 is preferably slightly over-size such as to grip the inside of sleeve 21 to hold it in position. When so gripped the cross-section of the sleeve may be deformed to an ellipse at the wide point of the loop 13. Stop loop 19 prevents endwise removal of the sleeve from the outer handle section 12.

The pad 10 may be formed from a sheet of a suitable inexpensive material such as sponge rubber or foamed plastic, and after being doubled over the wing loops 16 is held in place as by staples 24 passing through the loops. To prevent tearing out of the staples at the meeting edges of the pad, a pair of tough synthetic fabric strips 23 may be doubled over these edges to be gripped by the staples. In addition, the meeting faces of the pad may be bonded together by a suitable waterproof adhesive in the region of the wing loops.

When the swab is in storage position the sleeve 21 is located entirely on one of the handle sections 11–12 and the outer section 12 is folded inwardly to lay along the inner section 11, whereupon the elastic band 22 is moved endwise and snapped over the free end portion of the outer folded section to hold the sections in the folded position. More specifically, when the sleeve is on the outer section 12 as shown in FIG. 2, the stop loop 19 is positioned between the diverging branches 15–15 and the band 22 is stretched over the loop to occupy the illustrated locking position. In the alternative, when the sleeve is on the inner section 11 as viewed in FIG. 3, the outer section 12 is swung back over the sleeve and the band occupies a position over the sleeve and branches 18—18 adjacent the stop loop 19 after being stretched over the latter.

With the handle folded the swab can be used to wipe off condensation or otherwise clean automobile windows and mirrors within easy reach. If the rear window is fogged on the inside, the driver can readily extend the handle by releasing the elastic band 22, swinging out the outer section 12 and sliding the sleeve 21 over the hinge joint 13, 20 of the handle to stiffen it. The handle is made long enough in this extended position for the driver to then reach the pad 10 to the rear window without need of leaving the driver's seat. When the handle is again collapsed the swab can be conveniently stored beneath the seat or laid on the dashboard.

Directing attention to FIG. 5, the inner handle section 11 can be modified in shape without departing from the invention. For example, the loops 16 which stiffen the pad 10 can be doubled back at their center as illustrated thereby forming two pairs of wings 16'. Also, another sleeve gripping loop 13' may be provided on the inner handle section 11 and/or provided on the inner end of the outer handle section 12 as indicated at 13". The significant points respecting these modifications are that there be adequate stiffening for the pad 10 and gripping of the sleeve 21 to hold it sleeved over the hinge 13, 20 when the handle sections are in their extended position.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A swab comprising, inner and outer handle sections of bent wire construction hingedly connected together at ends thereof, said inner section providing oppositely extending pad stiffening wings at its free end, a pad secured to said wings, a sleeve on one of said sections adapted to be moved endwise over the hinged ends of the sections when the sections are swung into an extended alined position from a folded position to thereby stiffen the hinge connection, and a sleeve gripping loop formed in at least one of said sections to hold the sleeve in hinge stiffening position.

2. A swab according to claim 1 in which the free end portion of said outer handle section is bent laterally to provide an end stop for the sleeve.

3. A swab according to claim 1 in which each of said wings comprises a pair of spaced arms, and said pad is doubled over said wings and has its halves secured together between said pairs of arms.

4. A swab according to claim 1 in which said sleeve gripping loop is formed at the hinged end of one of said handle sections, and the other handle section is formed with an eye looped over the bight of said loop to form the hinge connection between the handle sections.

5. A swab according to claim 1 in which said handle sections are each formed of a respective single length of wire, said sleeve gripping loop being formed in the inner handle section at the hinged end thereof and the ends of such loop continuing as side-by-side branches and then being bent oppositely to form said wings, and said outer handle section having its length of wire double on itself with the free ends formed into eyes looped over the bight of said gripping loop to form the hinge connection between the handle sections.

6. A swab according to claim 1 in which said sleeve has a deformable cross-section and said sleeve gripping loop has a maximum lateral extent slightly larger than the nondeformed inside cross-sectional dimension of the sleeve to grip the sleeve.

References Cited

UNITED STATES PATENTS

| 775,077 | 11/1904 | Dettmer | 15—220 |
| 1,111,575 | 9/1914 | Goodwin | 15—232 |
| 1,452,329 | 4/1923 | Utter et al. | 287—99 |

FOREIGN PATENTS

| 25,068 | 10/1897 | Great Britain. |
| 5,019 | 3/1905 | Great Britain. |

DANIEL BLUM, *Primary Examiner.*